Patented Feb. 21, 1939

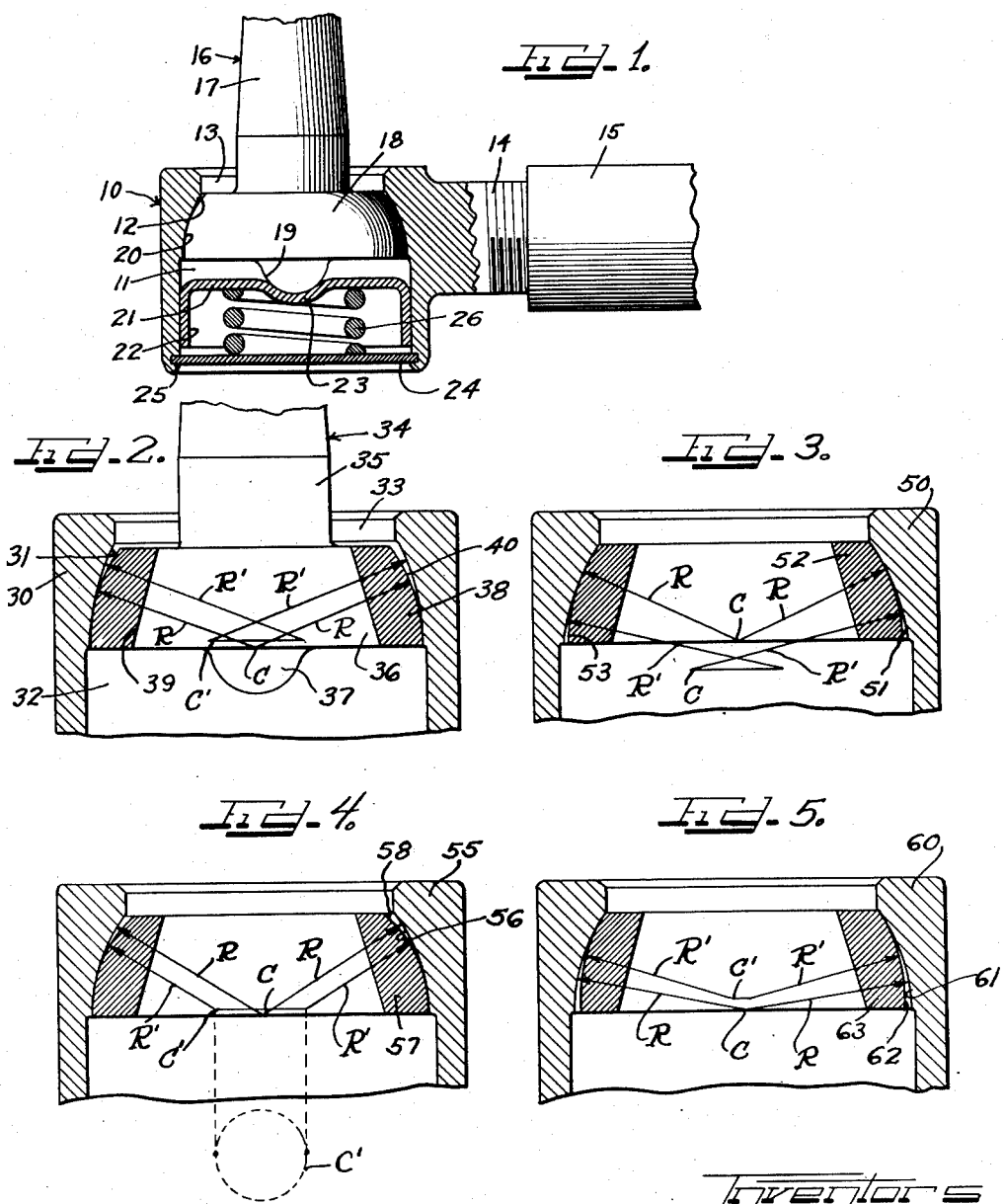

2,147,816

UNITED STATES PATENT OFFICE 2,147,816

JOINT STRUCTURE

George H. Hufferd and Joseph E. Casse, Detroit, Mich., assignors to Thompson Products Incorporated, Cleveland, Ohio, a corporation of Ohio Application November 2, 1936, Serial No. 108,747

4 Claims. (Cl. 287—90)

This invention relates to joint structures including relatively movable members having cooperating bearing surfaces of different curvatures.

More specifically, this invention relates to tie rod joints including a member having a fragmental spherical bearing surface in bearing relation with a member having a regularly curved bearing surface lying between a conical surface and a spherical surface, such as, for example, a toroidal surface, a paraboloidal surface or a hyperboloidal surface.

In universal joints, such as tie rod joints heretofore manufactured, the cooperating bearings usually were formed with identically curved surfaces. Thus, in a ball joint, the ball end of the stud was seated in a ball socket having a spherical bearing wall. In a joint having a seating element or a plurality of such elements interposed between the stud and socket, either the spherical head of the stud was seated on the spherical bearing surface of the seating element or the spherical outer bearing wall of the seating element was seated on the spherical bearing wall of the socket or both.

Such structures, however, require an accurate fitting or lapping of the cooperating bearing surfaces into position to obtain a good fit and the tolerance of variations in size in commercial tie rod joints is very small. For example, the spherical or segmental spherical bearing (stud head or seating element) in tie rod joints should only vary −.001 to −.003 inch from a basic size while the spherical or segmental spherical socket (housing bearing wall or inner bearing surface of a seating element) should only vary +.002 inch from a basic size.

It has also been proposed, in joint constructions, to seat a spherical headed stud on a frusto-conical socket to permit wider tolerance from basic sizes. However, the spherical bearing surface of the stud head, in such constructions, only has a sharp line contact with the conical bearing wall of the socket and during use of the joint must wear away the conical wall to a considerable extent in order to make its own seat on any appreciable area of the socket.

We have now found that a much greater tolerance of socket and bearing sizes can be permitted and a greater area contact obtained between the bearing and socket by seating a spherical bearing on a regularly curved socket wall lying between a converging straight wall and a spherical wall or by seating a bearing having such a regularly curved surface on a spherical socket wall. For example, in such constructions, the spherical bearing can vary −.002 inch from a basic size while the regularly curved socket can vary +.001 to +.005 inch from a basic size. Examples of suitable regularly curved surfaces for the bearing or the socket are toroidal surfaces, paraboloidal surfaces, and hyperbolodial surfaces.

It is then an object of this invention to provide joint structures permitting universal movement with a socket or bearing wall having a regularly curved surface lying between a frusto-conical surface and a spherical surface.

Another object of this invention is to provide tie rod joint constructions in which the stud member has a segmental spherical head seated on a socket having a regularly curved surface lying between a frusto-conical surface and a segmental spherical surface.

A further object of this invention is to provide a tie rod joint construction in which the stud member of the joint has a head formed with a regularly curved surface lying between a frusto-conical surface and a segmental spherical surface with the stud head seated in a socket having a fragmental spherical bearing wall for receiving the same.

A further object of this invention is to provide a tie rod joint in which a stud member has a frusto-conical head seated in a seating element having a frusto-conical inner wall for receiving the stud head and a segmental spherical outer wall seated on a socket bearing wall having a regularly curved surface lying between a frusto-conical surface and a spherical surface.

A further object of this invention is to provide joint studs, joint seating elements, or joint sockets having a regularly curved bearing wall lying between a converging straight line and a spherical curve.

A further object of this invention is to provide tie rod joint structures wherein the constituent elements are seated on appreciable areas and at the same time increase the tolerances from the basic sizes for said elements.

Other and further objects of this invention will become apparent to those skilled in the art from the following detailed description of the annexed sheet of drawings which discloses preferred embodiments of the invention.

On the drawing:

Figure 1 is a fragmentary vertical cross-sectional view, with parts shown in elevation, of a tie rod joint according to this invention seated in the end of a tie rod.

Figure 2 is an enlarged fragmentary vertical cross-sectional view, with a part in elevation, of a tie rod joint having a seating element interposed between the stud head and the joint housing with the outer bearing wall of the seating element having a segmental spherical curvature, and the bearing wall of the socket or housing being a toroidal surface.

Figure 3 is a fragmentary vertical cross-sectional view of a tie rod joint according to this invention in which a seating element having a segmental spherical bearing wall is seated on a housing bearing wall having a toroidal surface generated from a different plane than the surface of the housing illustrated in Figure 2.

Figure 4 is a fragmentary vertical cross-sectional view of another form of tie rod joint according to this invention in which a seating element having an outer toroidal surface is seated on a housing bearing wall having a segmental spherical surface.

Figure 5 is another fragmentary vertical cross-sectional view of a tie rod joint according to this invention in which a housing having a segmental spherical bearing wall receives a toroidal bearing wall of a seating element generated from a different plane than shown in Figure 4.

As shown on the drawing:

In Figure 1 the reference numeral 10 designates generally a joint housing having a cylindrical bore 11 extending therethrough, a toroidal bearing wall 12 converging inwardly from the cylindrical bore near the top of the housing, an annular opening 13 of reduced size, and a laterally extending shank portion 14. The shank portion 14 of the housing 10 is threaded in the end of a tie rod 15.

A joint stud 16 having a shank portion 17 extending freely through the opening 13 of the housing 10, and a head portion 18 and rounded end 19 disposed in the housing is formed with a segmental spherical surface 20 on the head 18 seated on the toroidal housing wall 12.

A retainer member 21 is slidable in the housing 10 in the bore 11 thereof and has a skirt portion 22 engaging the walls of the bore 11. The retainer 21 is provided with a depressed central portion 23 for receiving the rounded end 19 of the stud.

A closure plate 24 is spun into the bottom of the housing as at 25 and a coiled spring 26 is maintained under compression between the retainer 21 and the closure plate 24. The retainer is thus urged upwardly against the rounded end 19 to move the head 18 of the stud 16 into seating engagement with the wall 12 of the housing.

It should be noted from Figure 1 that the segmental spherical bearing surface 20 of the stud head 18 contacts the toroidal bearing surface 12 of the housing 10 intermediate the ends of the surface 12 over an appreciable area. Thus by designing the socket wall 12 to provide a non-spherical surface for receiving the spherical surface 20 it is possible to vary the tolerances from basic sizes of the socket over a wider range than heretofore since the stud head can contact the socket wall over an appreciable area either at the bottom portion of the wall, the middle portion thereof as shown in Figure 1, or the top portion of the wall. At the same time, however, a good bearing fit is obtained and rotation of the stud about its own axis as well as tilting movements of the stud relative to the housing in all directions are permitted.

In Figure 2 there is illustrated a joint housing 30 having a toroidal bearing wall 31 converging inwardly from the cylindrical bore 32 which extends through the housing. A circular opening 33 gives entrance to the housing.

A joint stud 34 has a shank portion 35 extending freely through the opening 33 of the housing, and a frusto-conical head portion 36 and rounded end portion 37 disposed in the housing.

A seating element 38 is interposed between the stud head 36 and the toroidal bearing wall 31 of the housing and has a frusto-conical inner wall 39 in engagement with the frusto-conical head 36 of the stud and a segmental spherical outer wall 40 in engagement with the toroidal surface 31 of the housing. A retainer member (not shown) is urged against the rounded end of the stud to move the stud head into full bearing engagement with the seating element and to carry the seating element into bearing engagement with the toroidal wall of the housing.

As shown in Figure 2, the seating element 38 contacts the housing bearing wall near the bottom thereof. This type of contact can be obtained by generating a segmental spherical surface on the seating element from a fixed center point C at the center of the seating element and at the base of the element. A fixed radius R is then swung around this center point and in a vertical plane to generate the segmental spherical surface of the seating element. The toroidal surface of the housing is generated from the periphery of a circle C' lying in a flat horizontal plane above the base of the seating element and thus above the point C from which the radius R is struck. A long radius R' is then swung in a vertical plane around the periphery of the circle C' from the side of the circle away from the surface to generate the toroidal surface or bearing wall of the housing. Thus by striking the radius for the toroidal surface from a circle lying in a horizontal plane above the point from which the radius for the spherical bearing surface of the seating element is struck the contact for the contact area between the housing and the seating element is maintained at the base of the element.

In Figure 3 the housing 50 has a toroidal inner bearing wall 51 struck from a long radius R' swung about the periphery of a circle C' lying in a horizontal plane below the base of a seating element 52 from the side of the circle away from the surface. The seating element 52 has a segmental spherical outer bearing wall 53 seated on the toroidal bearing wall 51 of the housing at the top thereof. The segmental spherical bearing surface 53 is struck from a center point C at the exact center of the base of the seating element on a radius R. Thus the positioning of the circle C' in a horizontal plane below the point from which the radius for generating the segmental spherical surface of the seating element is struck the area contact between the seating element and the housing is moved upwardly to the top of the seating element and housing.

In Figure 4 the reference numeral 55 indicates a housing having a segmental spherical inner bearing wall 56 generated by a radius R struck from a fixed center point C in the exact center of the housing at the base of a seating element 57. The seating element 57 has a toroidal outer bearing wall 58 generated from the periphery of a circle C' lying in a horizontal plane above the base of the seating element. The short radius R' is swung in a vertical plane around the periphery of the circle C' from the side of the circle adjacent the surface to generate the toroidal bearing surface 56 for the housing 55. Thus a segmental spherical seating element is seated on a toroidal bearing wall of a housing at the base area thereof by generating the segmental spherical surface from a point in a lower plane than a horizontal circle from which the radius for striking the toroidal bearing surface of the seating element is generated.

In Figure 5 the reference numeral 60 designates a joint housing having a segmental spherical bearing wall 61 therein for receiving in bearing engagement therewith the toroidal bearing wall 62 of a seating element 63. The area of contact between the bearing surfaces or walls is at the top of the seating element and housing bearing wall. This area contact at the top can be generated by swinging a radius R from a fixed center point C in the center of the housing at the base of the seating element 63 and by swinging a short radius R' from the periphery of a small circle C' lying in a horizontal plane above the point C from which the radius R is struck. It will thus be seen that the area contact between the seating element and the joint housing can be regulated to be at the top of the seating element and at the top of the housing bearing wall by diminishing the size of the circle C' from which the radius R' is struck.

The drawing therefore illustrates tie rod joints having segmental spherical bearing surfaces in bearing cooperation with toroidal surfaces over a contact area which can be regulated to be positioned either at the top, the bottom or intermediate the top and bottom of the cooperating bearing surfaces. The generation of the cooperating bearing surfaces so as to control the position of the contact area of the surfaces is shown in Figures 2 to 5. While each of the joints illustrated on the drawing has toroidal bearing surfaces it should be understood that this invention in its broader sense includes the seating of a segmental spherical bearing member on a regularly curved wall or bearing surface lying between a frusto-conical surface and a segmental spherical surface. The joints of this invention have the relatively movable parts thereof in seating engagement over a considerable area and still have the cooperating bearing surfaces of unlike curvature. The joints of this invention include joints having the stud head directly engaging the bearing walls of a socket member as well as joints having a seating element interposed between the stud head and the bearing wall of the socket member.

We are aware that many changes may be made and numerous details of construction may be varied through a wide range without departing from the principles of this invention, and we, therefore, do not purpose limiting the patent granted hereon otherwise than necessitated by the prior art.

We claim:

1. A joint structure comprising a housing having an opening giving entrance thereto and a converging toroidal bearing wall therein, a stud tiltable and rotatable relative to said housing, said stud having a shank portion extending freely through said housing opening, said stud also having a segmental spherical head portion associated therewith in bearing engagement with the toroidal bearing wall in the housing and means for urging the stud in the direction of convergence of the bearing surfaces for maintaining the joint elements in operative relation.

2. A joint comprising a housing having an opening giving entrance thereto and a converging segmental spherical bearing wall therein, a stud tiltable and rotatable relative to said housing, said stud having a shank portion extending freely through said housing opening, said stud including a head portion associated therewith having a toroidal bearing surface thereon in bearing engagement with the bearing wall in the housing and means for urging said stud in the direction of convergence of the bearing surfaces to maintain the joint elements in operative assembly.

3. A joint structure comprising a housing having an opening giving entrance thereto and a bearing wall therein converging towards the opening, a stud extending freely from said housing through said opening, a bearing associated with said stud and disposed in said housing, said bearing converging in the same general direction as the housing bearing wall for cooperation therewith, the cooperating surfaces of the bearing and bearing wall being of unlike curvature with one of the surfaces being segmental spherical and the other of said surfaces being generated from a regularly curved non-circular line rotated about the axis of the housing to allow for tilting and rotating movements of the stud relative to the housing, and means urging the stud bearing against the housing bearing wall whereby the stud bearing and housing bearing wall will be maintained in area contact with each other and said stud bearing and housing bearing wall may vary in size throughout a wide range without departing from said area contact.

4. A joint structure having a housing with an opening giving entrance thereto and a bearing wall therein converging towards the opening, a stud extending from said housing through said opening, a bearing associated with said stud and disposed in said housing, said bearing converging in the same general direction as the housing bearing wall and cooperating therewith, the cooperating surfaces of the bearing and bearing wall being of unlike curvature, with one of the surfaces being segmental spherical and the other of said surfaces being toroidal, to allow for tilting and rotating movements of the stud relative to the housing, and means urging the stud bearing against the housing bearing wall.

GEORGE H. HUFFERD.
JOSEPH E. CASSE.